United States Patent [19]

Buthmann

[11] 4,066,499
[45] Jan. 3, 1978

[54] METHOD OF COOLING THE CEILING REFLECTOR IN A NUCLEAR REACTOR

[75] Inventor: Hans-Peter Buthmann, Lippetal-Lippborg, Germany

[73] Assignee: Hochtemperatur-Kernkraftwerk GmbH (HKG) Gemeinsames Europaisches Unternehmen, Uentrop, Unna, Germany

[21] Appl. No.: 680,140

[22] Filed: Apr. 26, 1976

[30] Foreign Application Priority Data

Apr. 30, 1975 Germany .............................. 2519273

[51] Int. Cl.² .............................................. G21C 9/00
[52] U.S. Cl. .................................. 176/38; 176/58 PB; 176/60
[58] Field of Search ................. 176/37, 38, 58, 58 PB, 176/59, 60, 30, 31, 32

[56] References Cited
PUBLICATIONS

"HKG 300 MWe. Nucl. Power . . . Power Station Westfalen", Brown, Boveri & Cie AG, 1/72, pp. 1-28.

*Primary Examiner*—Samuel W. Engle
*Assistant Examiner*—Ralph Palo
*Attorney, Agent, or Firm*—Toren, McGeady and Stanger

[57] ABSTRACT

In a gas-cooled solid-moderated high-temperature reactor where fuel elements are introduced into the core through feed pipes in the ceiling reflector, the ceiling is cooled after reactor shutdown by introducing cooled gas through centrally arranged feed pipes and by removing the gas through the other feed pipes located radially outwardly of the inlet feed pipes. This arrangement effects a flow of the gas generally radially outwardly over the ceiling reflector. After the gas is removed from the core it is circulated through a closed circuit, cooled and blown back through the inlet feed pipes into the core.

7 Claims, 1 Drawing Figure

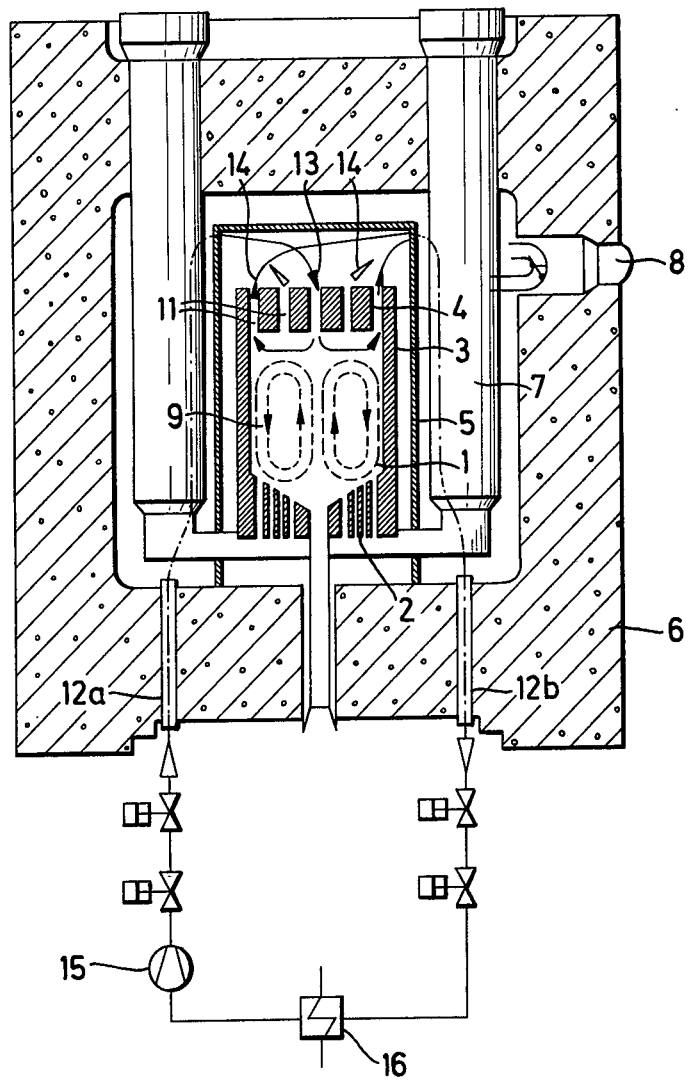

METHOD OF COOLING THE CEILING REFLECTOR IN A NUCLEAR REACTOR

SUMMARY OF THE INVENTION

The present invention is directed to a method of protecting the ceiling reflector in a shutdown, gas-cooled, solid-moderated, for example, graphite-moderated, high-temperature reactor using spherical fuel cells which are fed into the reactor core through feed pipes provided in and extending through the ceiling reflector.

During nuclear reactor operation, radioactive fission products are formed and, due to their radioactive decay, generate so-called decay heat. After a reactor is shut down, the decay heat poses a problem in effecting its safe elimination to avoid any inadmissible stresses in the metallic and ceramic fittings within the reactor. Various operating and emergency systems are known for the elimination of the afterheat and such systems must conform to extremely strict requirements regarding reliability for safety reasons. As a result, the known systems frequently encounter considerable operating restrictions. Various methods have been suggested for increasing the reliability of known afterheat elimination systems, for example, containment of the systems, as well as the installation of emergency control points for controlling the results of the afterheat elimination systems caused by external influences. However, such methods involve very considerable costs.

In attempting to simplify the safety systems used for afterheat removal while maintaining the same or increasing the safety, the elasped time between reactor shutdown and the commencement of the elimination of the afterheat plays a very significant role. Reactors of the type mentioned above have the advantage that the large amounts of solids in the reactor can act as heat accumulators after shutdown from full load operation. It was found in the graphite-moderated THTR-300, for example, that the reactor core has a storage capacity which permits a delay of at least one hour before it is necessary to eliminate the afterheat by forced circulation of the primary circuit.

To fully utilize this delay, care must be exercised that no fittings or parts of fittings are jeopardized because of the afterheat. Normally no harmful effects are likely in this respect with regard to the side reflector and bottom reflector of the core as well as to the fuel elememts. However, the same is not true for the ceiling reflector which is suspended above the core in such a reactor. Among the materials used for suspending the ceiling reflector are ones whose special properties are adversely affected at the level of the temperatures resulting from the afterheat.

To protect the suspension of the ceiling reflector, redundant devices must be provided which start an early elimination of the afterheat so that the exposure of the suspension and absorber rods to harmful temperatures is avoided.

Since the steam generator-blower units of the reactor system are generally used for the elimination of the afterheat following an intentional reactor shutdown or a shutdown caused by a malfunction, the use of such units is geared within the framework of the safety regulations, among other factors, to the permissible temperature load on the ceiling reflector suspension. For example, the breakdown of one of the six similar steam generator-blower units is considered permissible for the further operation with the remaining units. However, small defects in fittings, position indicators or sensors can frequently be the cause for operating the nuclear plant with only five units so that minor malfunctions in another unit could automatically start up the elimination of the afterheat over emergency systems provided for that purpose and would result in high stresses on the metallic and ceramic fittings in the reactor causing an unnecessary reduction in the life of the reactor. As can be seen from the foregoing considerations, the malfunctions which actuate these emergency measures can be frequently eliminated in a very short time, however, in the present systems certain measures must be taken which are actually necessary only for serious reactor breakdowns.

Therefore, the object of the present invention is to provide a method of cooling a ceiling reflector so that the time in between the breakdown and the point at which the suspension of the ceiling reflector is jeopardized, can be increased, or the danger of such an occurrence can be completely eliminated without impairing the safety of the reactor plant. The solution afforded by the present invention is based on the concept of incorporating the storage capacity of a solid-moderated reactor core into the shutdown considerations and exhausting afterheat with respect to the ceiling reflector in an advantageous manner so that it is possible to eliminate the causes of minor malfunctions without using the elaborate and time-consuming emergency systems of the plant. In a reactor of the above-mentioned type, the problem is solved by injecting a cooled gas through certain of the fuel element feed pipes and removing the gas through the remaining fuel element feed pipes. Accordingly, existing devices can be used for advantageously effecting local cooling of the ceiling reflector. In nuclear reactors of the type mentioned, spherical fuel cells are fed into the core from the top through feed pipes extending through the ceiling reflector. These feed pipes are available after reactor shutdown and can be used in accordance with the present invention for passing a continuous cooled gas curtain over the ceiling reflector by circulating the gas through certain of the fuel element feed pipes and removing it through the remainder of such pipes. Moreover, it is possible to optimize the cooling gas curtain for reactor cores of larger diameters by providing additional ducts for circulating the gas.

If the cooled gas is injected through the fuel element feed pipes located in the central position of the ceiling reflector, the direction and velocity of flow of the gas curtain can be adapted in a simple manner to the convection current developed in the reactor core after shutdown. Since the internal natural circulation caused by convection, that is, the cooling gas flow developed on the basis of the temperature gradient within the core with the blower shut down, flows upwardly through the center of the core and downwardly in the radially outer peripheral region, the supply of the cooled gas through the feed pipes arranged in the central region of the ceiling reflector — the discharge is effected through the feed pipes disposed radially outwardly from the central region — results in the boundary layer regions between the hot gas in the natural circulation through the core and the injected cooled gas in a similarly directed flow over the ceiling reflector, which increases the effectiveness of the cooled gas curtain, since eddies are kept at a minimum.

Beyond the foregoing, it is possible with the same directional flow of the two gas flows in the boundary region to vary the position of the boundary flows in a simple manner by a corresponding variation in the gas flow directed through the feed pipes, which can be adjusted to the temperature of the ceiling reflector in a manner adaptable to the particular situation.

Furthermore, the effectiveness of the cooling gas curtain can be influenced by dividing the feed pipes into gas injection pipes and gas removal pipes. It has been found to be advantageous if a lesser number of the feed pipes are used for injecting the cooled gas than for its removal. In this way it is possible to take into account that the cooled gas mixes to some extent with the hot gas flowing over the fuel elements within the core or reactor bed as it passes from the injection pipes to the removal pipes and is slightly heated whereby the gas removed has a greater volume due to its somewhat higher temperature as compared to the inflow gas.

In this regard it should be noted that the cooled gas will be heated to a lesser extent — and the protection of the ceiling reflector will be more effective — the sooner the cooled gas flow commences after shutdown of the forced cooling system of the reactor, since the heating of the reactor at its cooler upper end is still relatively low and the mixing of the cooled gas with the gas flowing by natural convection through the core results in a reduced amount of heat transfer. If helium is used as the coolant for the reactor core and as the cooled gas flowing over the ceiling reflector, the fact that hot and cold helium do not mix well has a positive effect in locally limited heating of the ceiling reflector by heated helium, penetrating occasionally up to the ceiling reflector, is insignificant, due to the thermal capacity and the rapidly onsetting temperature equalization in the ceiling reflector.

By varying the amount of the coolant gas flow, both the temperature of the ceiling reflector and the amount of heat dissipated from the core can be adjusted within certain limits. This can be achieved either by intermittent operation or by varying the delivery. Discharged coolant gas is returned to the reactor core preferably after passing through a cooler located in a closed circuit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The drawing is a schematic view of the abovementioned THTR-300 (thorium high-temperature reactor) embodying the present invention.

DETAILED DESCRIPTION OF THE INVENTION

In the drawing, a thorium high-temperature reactor is illustrated containing a reactor core 1 consisting of a charge of spherical fuel elements, not shown, arranged within a cylindrical vessel. The vessel is formed by an envelope constructed of graphite blocks, which serves as a neutron reflector and surrounds the core on all sides. The envelope consists of a bottom reflector 2, a side reflector 3 and a ceiling reflector 4, which is designed as a suspended ceiling of individual graphite blocks suspended from the top of the vessel enclosing the reactor core by means of suitable bolts, not shown, and a supporting arrangement, also not shown. The entire graphite block arrangement along with its fittings is arranged on a steel plate which together with a steel wall surrounding the graphite envelope and a ceiling plate forms a so-called thermal shield 5 which affords protection against gamma rays emitted from the core.

The reactor core, as well as the other essential parts of the primary circuit of the reactor, are surrounded by a pressurized casing 6 which in the present case is a prestressed concrete tank. Essential parts of the primary circuit including the steam generators 7 and the coolant gas blowers 8 are located within the tank.

The direction of the circulating coolant gas is indicated by the arrows 9 and this circulation takes place when the blowers 8 are turned off. This is a natural internal circulation caused by convection and it is established in the reactor core on the basis of the temperature gradient prevailing within the core. As can be seen from the drawing, the flow passes upwardly through the center of the core then moves radially outwardly and then downwardly along the periphery of the core.

In the type of reactor schematically represented in the drawing, feed pipes 11 for the spherical fuel elements extend through the ceiling reflector 4. A total of fifteen feed pipes 4 are provided through the ceiling reflector with three located in the center of the reflector and the remaining twelve are uniformly distributed about the circumference of the reflector. These feed pipes 11 which are used for introducing the fuel elements into the top of the core for subsequent movement downwardly to the bottom of the core and out through the pressurized casing 6, afford the formation of a cooled gas curtain across the surface of the ceiling reflector within the upper portion of the core chamber. Accordingly, cooled gas, preferably helium, is blown centrally into the interior of the reactor core in the direction of the arrows 13 and is withdrawn over the radially outer feed pipes in the direction of the arrrows 14. The arrows shown immediately below the inside surface of the ceiling reflector indicate the curtain effect flowing radially outwardly from the central region to the periphery of the reflector. The removed cooled gas is conducted over ducts 12b to a cooler 16 and then continues to flow in a closed circuit through a blower 15 back to the centrally positioned feed pipes 11. Valves are shown in the closed circuit containing the blower 15 and the cooler 16 for controlling flow of the cooled gas.

In a particularly advantageous manner, the effectiveness of the cooled gas curtain can be influenced by a particular division of the feed pipes 11 into inlet and outlet pipes. It has been found to be particularly effective if the three centrally arranged pipes as well as three evenly distributed radially outwardly located pipes are used as inlet pipes for supplying the cooled gas into the core, while the remaining nine feed pipes serve as suction or outlet pipes for removing the cooled gas.

Since the gas flowing through the outlet pipes is circulated through a cooler, the cooled gas curtain flowing over the ceiling reflector makes a certain contribution to the elimination of afterheat. In connection with the high thermal capacity of the graphite fittings and also of the liner cooling, the measures according to the invention for cooling the ceiling reflector as well as its suspension and metal fittings, lead to a safe shutdown state of the reactor over a longer period of time and this ability to cool the ceiling reflector is also ensured after the entire cooling system has broken down.

Therefore, in accordance with the present invention, it is possible to continue operation with more than one defective steam generator-blower unit, so that the availability of the reactor plant is considerably increased. The present invention makes a valuable contribution to the safety measures available at the present time and the inventive method is characterized by simplicity, its relatively low cost, and its lack of susceptibility to operating difficulties.

While a specific embodiment of the invention has been shown and described in detail to illustrate the application of the invention principles, it will be understood that the invention may be embodied otherwise without departing from such principles.

What is claimed is:

1. A method for cooling the ceiling reflector in a shutdown gas-cooled, solid-moderated, high-temperature reactor using spherical fuel elements which are fed into the reactor core chamber through feed pipes extending through the ceiling reflector of the core wherein during shutdown including terminating the feed of the fuel elements into the core and terminating the supply of gas coolant into and its removal from the core so that an amount of gas coolant remains in the core, comprising the steps of injecting a cooled gas through some of the feed pipes into the upper portion of the core chamber adjacent the ceiling reflector and removing the injected gas from the upper portion through the other feed pipes for establishing a flow of the cooled gas over the ceiling reflector within the upper region of the core chamber.

2. A method, as set forth in claim 1, including the steps of injecting the cooled gas through feed pipes centrally arranged in the ceiling reflector and removing the gas through feed pipes arranged in the ceiling reflector generally radially outwardly from the inlet feed pipes for effecting the flow of the gas from the central region of the ceiling reflector toward its peripheral region.

3. A method, as set forth in claim 2, including using helium gas as the cooling gas.

4. A method, as set forth in claim 2, comprising using a lesser number of the feed pipes for injecting cooling gas than the number used for removing the gas.

5. A method, as set forth in claim 4, including the step of arranging the number of injecting feed pipes to the number of removing feed pipes in the ratio of 2 to 3.

6. A method, as set forth in claim 2, including the step of regulating flow of the cooled gas over the ceiling reflector in dependence on the temperature of the ceiling reflector and the decay heat.

7. A method, as set forth in claim 2, including the steps of, after removing the cooled gas through the outlet feed pipes, circulating the gas in a closed circuit for returning it to the inlet feed pipes, and cooling the gas within the closed circuit and blowing the cooled gas back through the inlet feed pipes.

* * * * *